L. BARTLETT.
BOTTLE SEAL ASSEMBLING MACHINE.
APPLICATION FILED APR. 15, 1909.

993,288.

Patented May 23, 1911.
5 SHEETS—SHEET 1.

WITNESSES
Daniel Webster, Jr.
P. A. Conroy

INVENTOR
Leonard Bartlett.
BY
Garry P. VanWye
ATTORNEY

L. BARTLETT.
BOTTLE SEAL ASSEMBLING MACHINE.
APPLICATION FILED APR. 15, 1909.

993,288.

Patented May 23, 1911.
5 SHEETS—SHEET 3.

WITNESSES
Daniel Webster, Jr.
O. A. Monroy

INVENTOR
Leonard Bartlett.
BY
Garry P. Van Wye
ATTORNEY

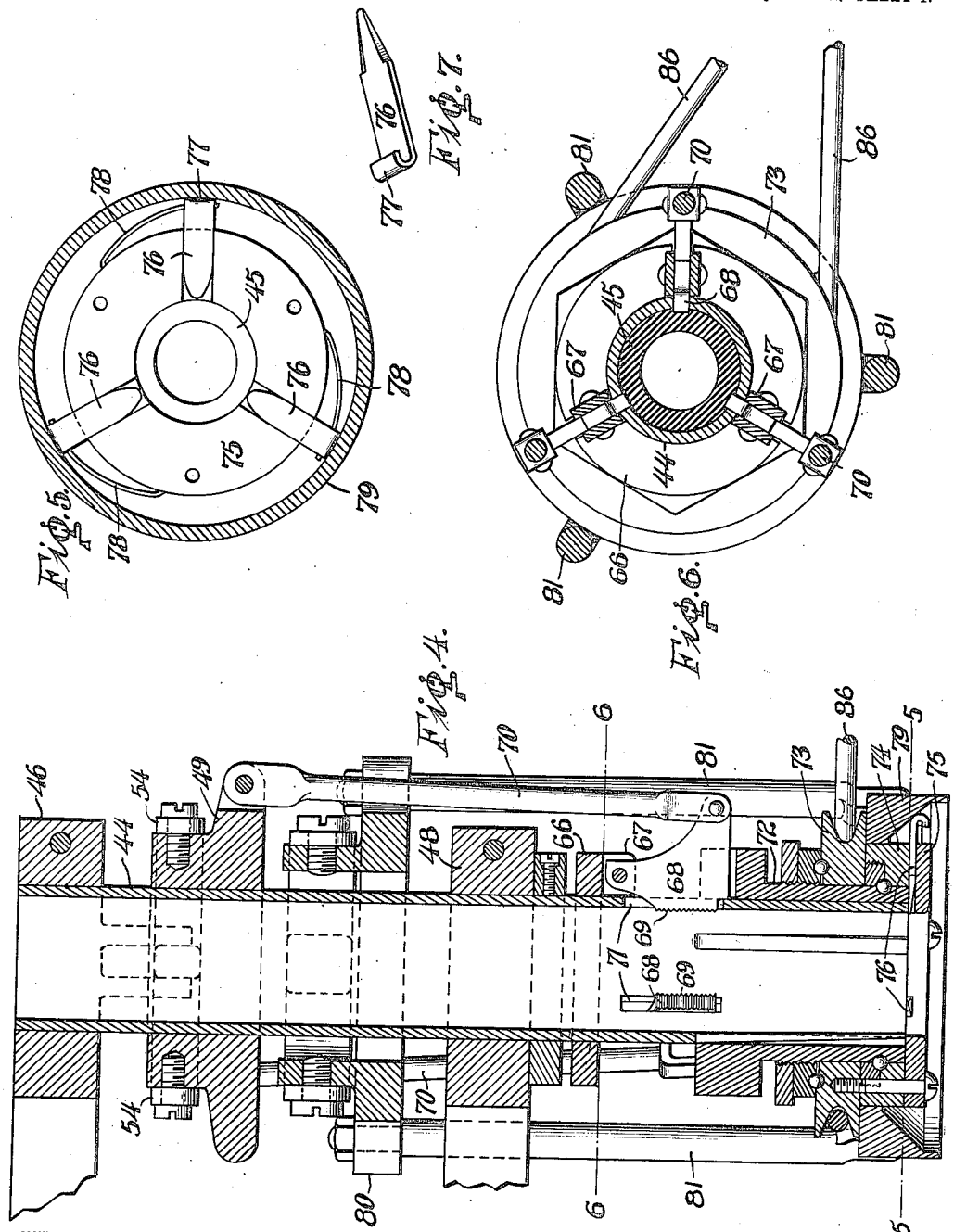

L. BARTLETT.
BOTTLE SEAL ASSEMBLING MACHINE.
APPLICATION FILED APR. 15, 1909.
993,288.
Patented May 23, 1911.
5 SHEETS—SHEET 5.
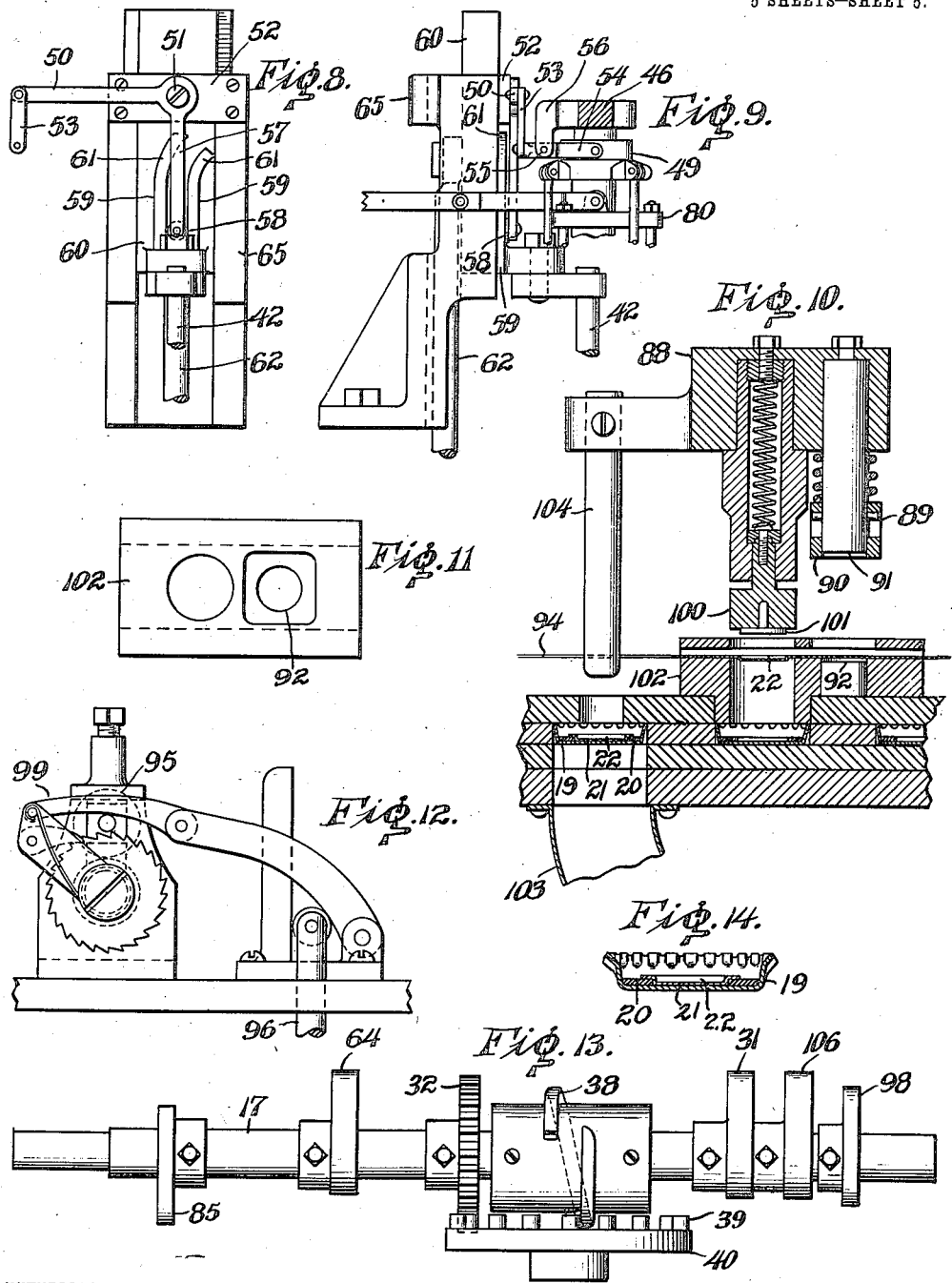
WITNESSES
Daniel Webster, Jr.
P. A. Conroy.
INVENTOR
Leonard Bartlett.
BY
Garry P. Van Wye
ATTORNEY

UNITED STATES PATENT OFFICE.

LEONARD BARTLETT, OF PHILADELPHIA, PENNSYLVANIA, ASSIGNOR TO AMERICAN CORK AND SEAL COMPANY, OF PHILADELPHIA, PENNSYLVANIA, A CORPORATION OF MAINE.

BOTTLE-SEAL-ASSEMBLING MACHINE.

993,288.

Specification of Letters Patent.   Patented May 23, 1911.

Application filed April 15, 1909. Serial No. 490,065.

*To all whom it may concern:*

Be it known that I, LEONARD BARTLETT, a citizen of the United States, residing at Philadelphia, in the county of Philadelphia and State of Pennsylvania, have invented a new and useful Bottle-Seal-Assembling Machine, of which the following is a specification.

This invention relates to machines for assembling bottle seals in which rubber gaskets and aluminum protecting disks are used; and has for its object to provide a machine of the character described in which the metal sealing caps may be placed, and the rubber gaskets and aluminum protecting disks are automatically placed in position within the cap; a further object being to provide a suitable gasket cutting machine which will operate in conjunction with the driving mechanism of the assembling machine, and which will cut the rubber gaskets and deposit them within the metal cap; a further object being to provide suitable mechanism to cut out and form the aluminum disks, and to force the disk when formed into the cap after suitable pasting apparatus has deposited sufficient paste to secure the disk to the metal cap, whereby the aluminum disk is brought into close contact with the center of the metal cap and may be secured thereto by the paste.

It is also the object of this invention to provide simple and coördinate parts which will work together to make an effective assembling machine.

The invention is illustrated in the accompanying drawings in which—

Figure 1:
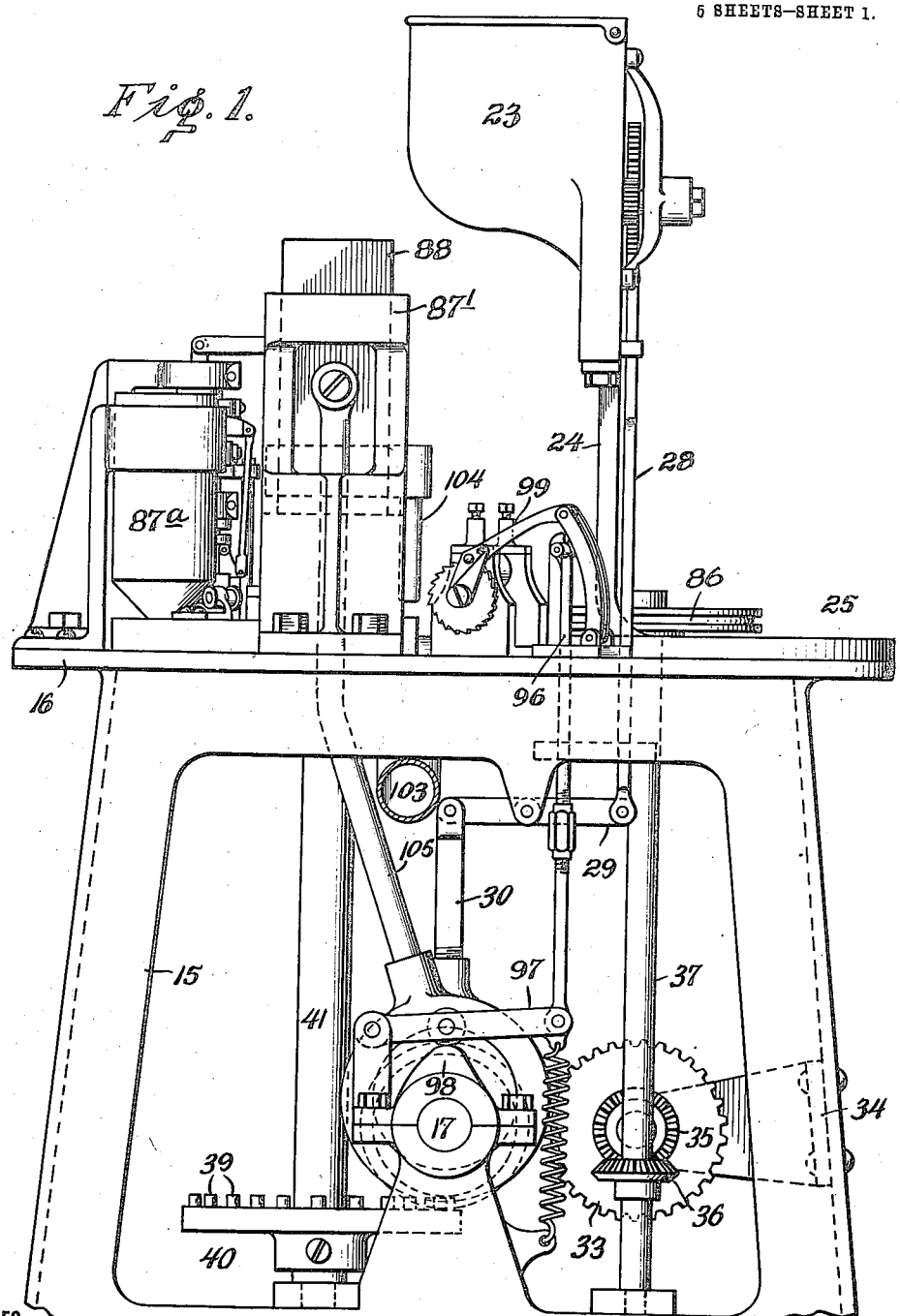
Figure 2:
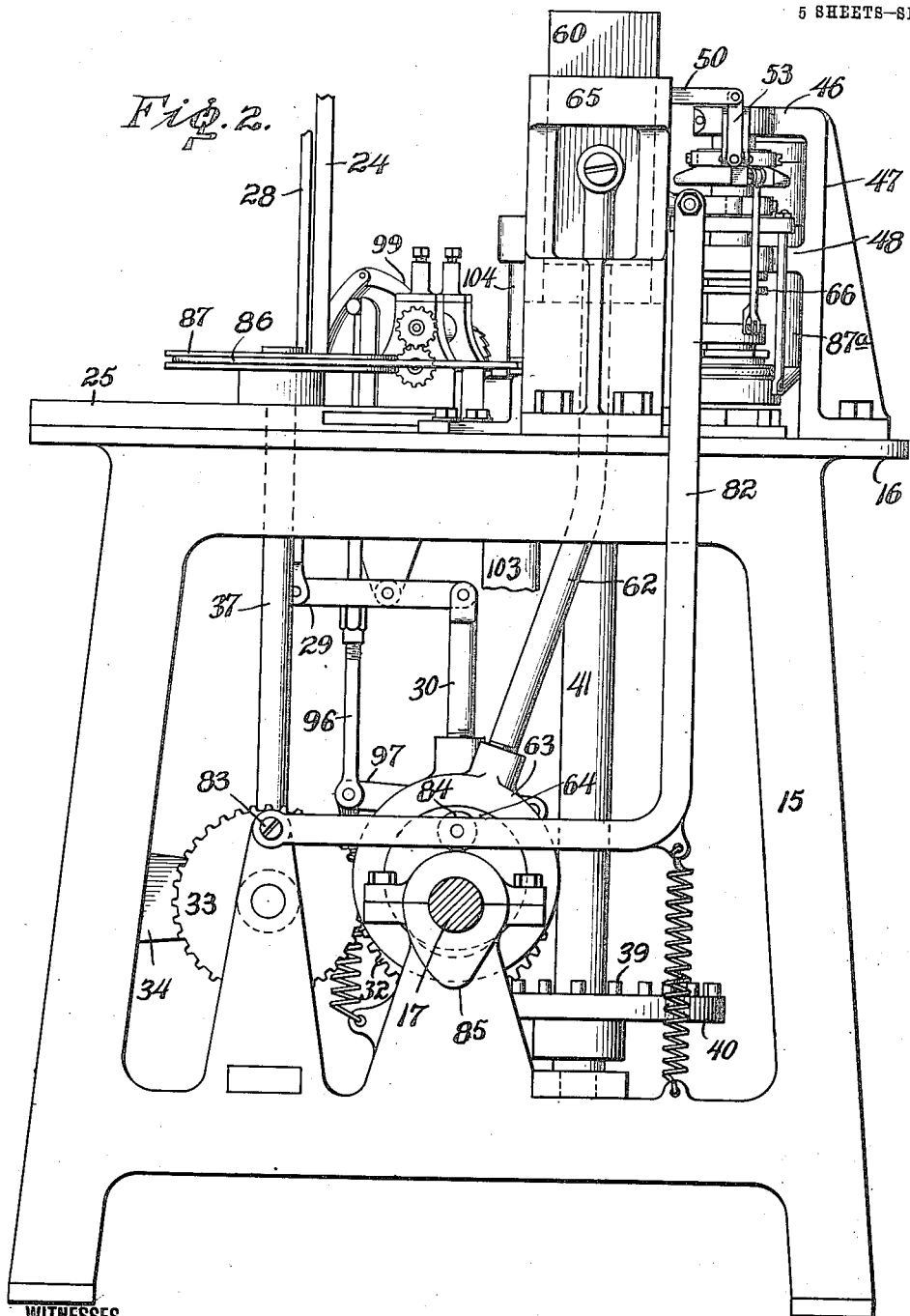
Figure 3:
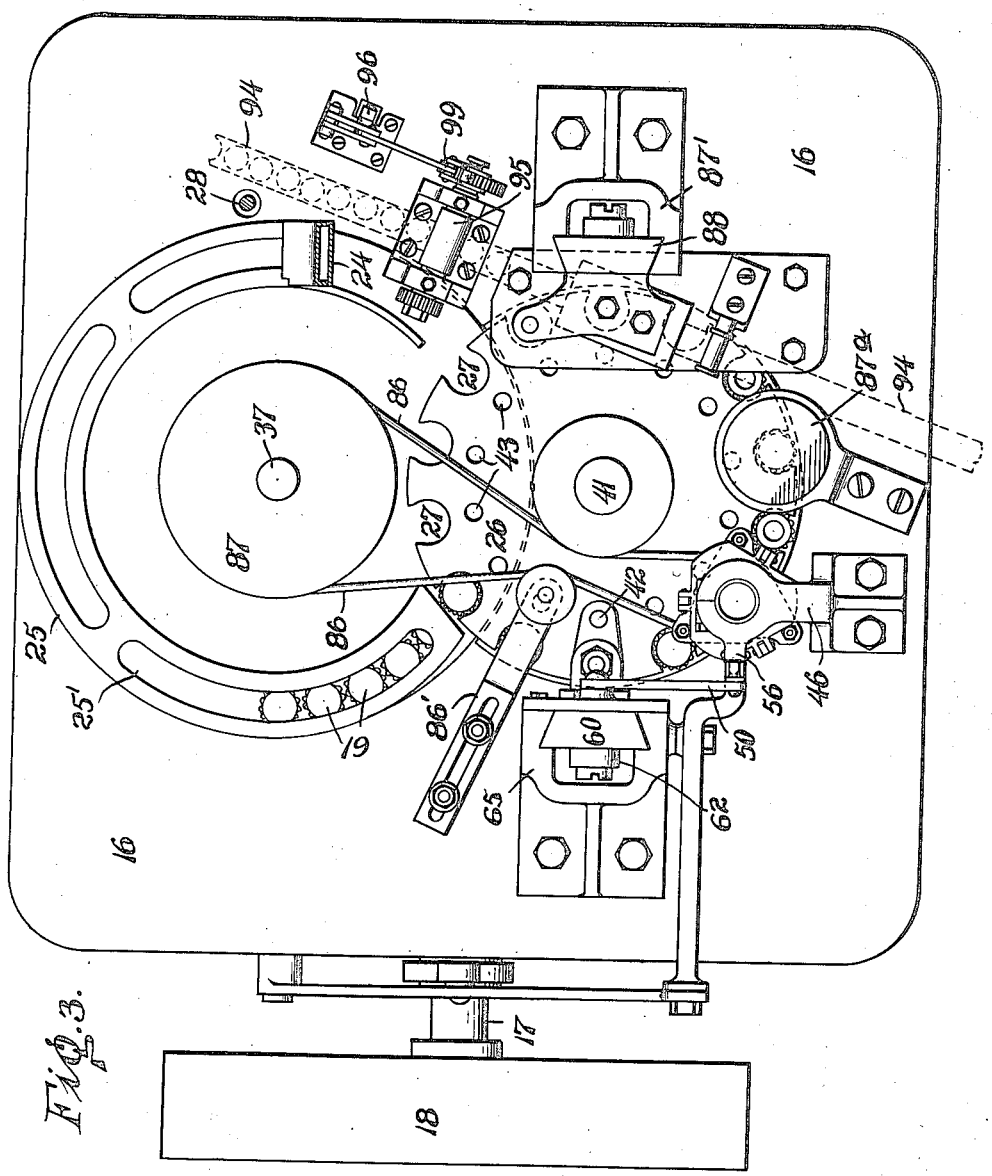

Figure 1, is a side elevation of a bottle seal assembling machine constructed according to my invention; Fig. 2, is a view of the opposite side of the machine, with the cap hopper and feed mechanism removed; Fig. 3, is a top plan view of the machine; Fig. 4, is a vertical section of the gasket cutting machine; Fig. 5, is a sectional view thereof on the line 5—5 of Fig. 4; Fig. 6, is a sectional view on the line 6—6, of Fig. 4; Fig. 7, is a perspective view of one of the cutting blades shown in Figs. 4, and 5; Fig. 8, is a face view of a part of the operating device for the gasket cutting machine; Fig. 9, is a side view of the same; Fig. 10, is a vertical section of the aluminum disk forming and depositing apparatus; Fig. 11, is a plan view of the forming and punching die; Fig. 12, is a side elevation of the operating mechanism for the aluminum feed; and, Fig. 13, is a side view of the main shaft and cams; and Fig. 14, is a sectional view of the seal assembled, on a larger scale.

In the drawings, like numerals of reference refer to the same parts in each of the views; and in practice I provide a frame 15, having a table, or platform 16, on which are mounted the assembling parts hereinafter described; and in the frame adjacent to the base thereof is mounted a shaft 17, which may be driven by a belt pulley as 18, by which the entire assembling machine may be operated.

The machine is adapted to assemble a seal, such as shown in Fig. 14, comprising a metal sealing cap, as 19, a rubber ring-shaped gasket 20, and an aluminum protecting disk 21, with a depressed center 22, adapted to contact with the center of the cap 19, within the gasket 20, and to be secured to said cap by adhesive material, or in any desired manner. To assemble these seals quickly, and in an economical manner, a hopper 23, is provided in which the metal caps may be placed, and in which apparatus of well known construction is operated to feed the caps down the chute 24, to a rotatable feed wheel 25', within the channel 25, which carries the caps around to the wheel 26, having spaced notches, as 27, in the periphery thereof into which the caps are fed, and by this wheel 26, are fed to the different parts of the assembling machine in regular and definite order.

To operate the parts just described, a shaft 28, is pivotally connected with the rocking bar 29, the opposite end of which is connected with the shaft 30, which is operated vertically by the cam 31, on the shaft 17. This mechanism operates the hopper feed mechanism in a manner well known, and consequently, not more fully illustrated here. The feed wheel 25', is rotated by the spur gear 32, on the shaft 17, which engages the spur gear 33, bracketed on the frame at 34, and which operates the beveled gears 35, and 36, and the shaft 37, connected with this wheel,—this part also being a well known construction. The notched wheel 26, is operated by means of a worm 38, on the shaft 17, which engages successively pins 39, on the wheel 40, mounted on the shaft 41, on the top of which the wheel 26, is mounted, whereby the wheel 26, is rotated forward in regular steps to carry the caps to the several assembling parts, and leave them in position a sufficient length of time for the parts to operate upon.

It will be understood that the metal caps are formed in separate machines, or punches; and are placed in this machine solely for the purpose of having the gaskets and protecting disks placed therein. Consequently, the parts described thus far have to simply feed these caps to the wheel 26, so as to place a cap in each notch 27, with the proper side up to receive the gasket and disk.

It is one object of this invention to form the metal disk and cut it out, and also form, or cut the rubber gasket as well as assemble these parts in the cap to form the seal. As the gasket is deposited first, I will describe this part at this point, and the other parts of the machine in the regular order in which they operate.

It will be understood that the several parts, or assembling devices, are spaced a suitable distance apart, so that when the wheel 26, is held stationary by the pin 42, engaging successively the holes 43, in this wheel, in a manner well known in such machines, one of the notches will be directly beneath each device, and will remain there a sufficient length of time for each device to operate.

Referring to the gasket forming machine, or device,—this part is specially shown in a partial view at the right of Fig. 2, and specifically in Figs. 4, 5, 6, and 7; and the operating means specifically in Figs. 8 and 9. The gasket machine comprises a tube 44, of a size to receive a tubular section of rubber 45, as shown in Figs. 5, and 6; and the upper end of the tube 44, is secured in the arm 46, of the standard 47, and a second arm 48, supports the tube 44 centrally thereof, as particularly shown in Fig. 4. Slidably mounted on the tube 44, is an annular block 49, which is pivotally connected with a lever 50, which is pivoted at 51, to a cross plate 52, as specially shown in Fig. 8. The lever 50, is connected with the block 49, by the link 53, and yoke 54, which is pivoted at 55, to an arm 56, projecting from the arm 46. The lever 50, is provided with a depending arm 57, on the lower end of which is a friction roller 58, which is mounted between two guides 59, on a vertically movable block 60; and the upper ends of the guides are concentrically curved, as shown at 61, whereby when the block 60, descends until the roller 58, engages the curved parts of the guides, the roller will be carried laterally, as will be understood, and with it the lower end of the arm 57, of the lever 50, as will also be understood, causing the outer end of the lever 50, to descend; and as this end is connected with the block 49, through the link 53, and yoke 54, the block 49, will be forced downward on the tube 44. The slide block 60, is connected with a shaft 62, secured to a strap 63, on a cam 64, on the shaft 17, by which this block is moved in the guide frame 65. An annular ring 66, is also slidably mounted on the tube 44, and is provided with lugs 67, in which are pivotally mounted the feed pawls 68, preferably three in number, and substantially triangular in shape, as shown at the right in Fig. 4, with the vertical side provided with teeth, as 69, in order to take a firm hold on the rubber tube. Pivotally mounted in the third corner of each pawl is a link 70, the upper end of which is pivotally connected with the annular block 49, and these links, three in number as shown, form the only connection between the block 49, and the ring 66, so that in lifting the annular block 49, the ring 66, will be raised a short distance through the links 70, and pawls 68; but these links being connected with the outer corners of the triangular-shaped pawls, the pawls will be drawn backward out of the slots 71, in the tube 44. When, however, the annular block 49, is driven downward, as previously described, the links will drive the pawls inward until in tight contact with the rubber tube, and the rubber tube will be carried downward a short distance with the pawls and ring 66, as will be understood, to feed the rubber tube the required amount to form a gasket. Mounted on the lower end of the tube 44, is a sleeve 72, on which is rotatably mounted a belt wheel 73, secured to a ring 74, to which is clamped a grooved ring 75, in the grooves of which are mounted blades 76, preferably three in number, and of the form shown specially in Fig. 7, each blade having a hooked end 77, in which is mounted a spring 78, whereby the ends of the blades are held normally against the cam ring 79, which is non-rotatable. This cam ring is secured to a head 80, by posts 81, and is vertically movable therewith. The head 80, is loosely mounted on the tube 44, and is operated vertically by a crank lever 82, pivoted to the frame at 83, and carrying a friction roller 84, which engages the cam 85, on the shaft 17, the head 80, being sufficiently loose to allow of operation by the lever 82.

In operation the pulley 73, is operated by a belt 86, which engages a pulley 87, on the shaft 37. When a cap is directly beneath the tube 44, and the rubber has been driven down the required length to form a gasket, the cam 85 operates to force the head 80, downward, and with it the cam ring 79, the cam surface of which bears against the hooked end of the blades 76; and as this ring descends, the blades are driven inward into the rubber tube 45; and as the blades are in the rotatable part, they are carried around rapidly as they are forced inward, thereby cutting off a section of the rubber tube to form a gasket; and, as previously mentioned, the cap being directly beneath, the tube 44, the gasket when cut will drop into the cap, and will be carried forward by the next movement of the wheel 26, and another cap will be brought under the tube for the repetition of the operation. To insure the positive operation of the knives, I prefer to provide a belt tension device, as 86'. After the gasket is deposited in the cap, the cap and gasket are carried forward to the paste machine 87ª, where a suitable amount of paste, or adhesive material is deposited in any desired manner so as to engage the center of the cap within the gasket ring; and the cap and gasket are then carried forward to the aluminum disk former and die. This part comprises a frame 87', carrying the sliding head 88, in which is mounted the forming tool 89, comprising a spring-controlled contact block 90, and a plunger 91, which forces the aluminum into the cavity 92, to form the projecting portion 22, which afterward engages the center of the cap, as previously described. After the projection 22, is formed, the aluminum strip 94, is fed forward by the feed rolls 95, which are operated by the pawl mechanism shown in Fig. 12, operated by a plunger shaft 96, connected with a lever 97, operated by a cam 98, the pawl mechanism in Fig. 1, being indicated by 99. By this arrangement the aluminum is fed forward step by step as needed, and the required distance so that at the next movement the projecting portion 22, will be directly beneath the punch 100, and centrally thereof, so that the circular plate 101, of the punch will enter this projection, and after the disk is punched out and carried down through the die 102, the plate 101, will force the portion 22, into close contact with the center of the cap within the gasket ring, and the cement, or adhesive material will secure this portion to the cap whereby the rubber gasket will be permanently secured in position. After the seal is assembled, as described, it is carried forward to the chute 103, and a plunger 104, secured to the punch head, will insure the dislodgment of the completed seal, as will be understood. The punch is operated by a shaft 105, and cam 106, on the shaft 17.

As the operation of the several parts has been fully described in connection with each part, it will not be necessary to again describe the operation of the complete machine further than to state that as all of the parts are operated by the main driving shaft 17, on which the respective cams are mounted, and adjusted to bring into action the several parts at the proper time to insure the perfect working of the machine, all the parts will work together harmoniously and automatically to insure the production of perfect seals.

Having thus described my invention, what I claim as new and desire to secure by Letters Patent of the United States, is—

1. A bottle seal assembling machine comprising a cap feeding device, a gasket cutting device, and a disk forming device, and means to feed the caps from said feeding device to the gasket cutting device and disk forming device consecutively, for the purpose set forth.

2. A bottle seal assembling machine comprising a cap feeding device, a gasket cutting device, and a disk forming and placing device, means to feed a cap successively from said feeding device to the other devices named, and means to operate said parts in unison, for the purpose set forth.

3. A bottle seal assembling machine comprising a cap feeding device, a gasket cutting and placing device, a paste depositing device, and a disk depositing device, means to feed a cap successively from said feeding device to the other devices named, and means to operate said parts in unison, for the purpose set forth.

4. A bottle seal assembling machine comprising a cap feeding device, a gasket cutting and placing device, a paste depositing device, and a disk placing device, means to feed a cap successively from said feeding device to the other devices named, and means to operate said devices harmoniously, for the purpose set forth.

5. A bottle seal assembling machine comprising a cap feeding device, a gasket cutting and placing device, a paste depositing device, and a disk forming and placing device, means to feed a cap successively from said feeding device to the other devices named, and means to operate said devices in harmony, for the purpose set forth.

6. A bottle seal assembling machine comprising a cap feeding device, a gasket placing device, and a disk forming and placing device, means to feed a cap from said feeding device to the other devices successively, and means to operate all of said devices in unison, for the purpose set forth.

7. A bottle seal assembling machine comprising a cap feeding device, a gasket cutting and placing device, a paste depositing device, and a disk forming and placing device, and a driving shaft carrying cams and a gear, said cams being so mounted as to operate said parts in harmony, as and for the purpose set forth.

8. In a bottle seal assembling machine, a gasket cutting device comprising a material holder, a feeding device, a rotatable part, and means to rotate the same, spring-controlled blades mounted to move in a radial direction in said rotatable part, means to force said blades into the gasket material periodically, and means to operate said feeding device alternately with said blade-forcing-means, for the purpose set forth.

9. In a bottle seal assembling machine, a gasket cutting device comprising a material holding tube, a slide block mounted thereon, a slide ring mounted on said tube beneath said block, triangular-shaped pawls pivoted to said ring, and having teeth adapted to pass within slots in said holding tube to engage the gasket material, links connecting the outer corner of said pawls and said block, means to raise and lower said block whereby said ring is raised and lowered and said pawls are operated to feed said material, a rotatable member at the bottom of said tube and means to rotate the same, blades in said rotatable member, and a cam ring adapted to force said blades into the gasket material, and a main shaft on said machine adapted to operate said block and said cam ring alternately, as and for the purpose set forth.

10. In a bottle seal assembling machine, a disk forming and placing device comprising a pressure block and forming tool and die, and a cutting out die and placing tool carried by the same head, means to feed the metal from said forming tool and die to said cutting out die whereby the metal that is acted on by the forming die at one stroke is operated on by the cutting out die at the next stroke and a disk with a cup-shaped center and laterally-extending flange is formed and placed in position, and means to operate said device in harmony with the other parts of the assembling machine, for the purpose set forth.

11. In a bottle seal assembling machine, a disk forming tool and die and a combined cutting out die and placing tool carried by the same head, means to feed the metal from said forming tool and die to said cutting out die whereby the metal that is acted on by the forming die at one stroke is operated on by the cutting out die at the next stroke with the disk unchanged in shape by the cutting out die, said cutting out die and placing tool being spring controlled, for the purpose set forth.

12. In a device of the class described, the combination of mechanism for automatically cutting a strip of sealing substance into sections, mechanism for automatically positioning such sections within metallic caps, mechanism for automatically bringing said caps into position for receiving said sealing substance, mechanism for automatically forming a retaining member for said section, and mechanism for automatically placing and securing said retaining member in place within the cap, all of the mechanism being driven from a common power shaft, substantially as described.

13. In a device of the class described, the combination of mechanism for feeding a strip of sealing substance into position to be cut into sections, means for automatically performing said cutting operation, a rotatable ring having a series of recesses therein adapted to carry metallic caps, means for automatically rotating said ring in a step by step movement, means for positioning the severed section of sealing substance within said cap, a reel carrying a roll of sheet metal, means for feeding said sheet of metal into position to have retaining members for the sealing substance formed and cut therefrom by forming and cutting dies, means for positioning and securing said retaining members within the cap, and means for depositing a drop of adhesive substance within the cap prior to the insertion of the retaining member, substantially as described.

14. In a bottle seal assembling machine, a gasket placing device, and a disk forming and placing device, means to feed a cap from said gasket placing device to said disk forming and placing device, and means to operate both of said devices in unison.

Dated this 8th day of April, 1909.

LEONARD BARTLETT.

Witnesses:
 WM. A. BLAIR,
 D. C. WAINEWRIGHT.